United States Patent [19]
Regner

[11] Patent Number: 5,344,209
[45] Date of Patent: Sep. 6, 1994

[54] SUNROOF ASSEMBLY

[76] Inventor: Otto Regner, 5491 Winchester, Troy, Mich. 48098

[21] Appl. No.: 42,326

[22] Filed: Apr. 2, 1993

[51] Int. Cl.$^5$ .............................................. B60J 7/057
[52] U.S. Cl. .................... 296/223; 296/216; 296/220; 296/222
[58] Field of Search ................ 296/216, 220, 222, 223

[56] References Cited

U.S. PATENT DOCUMENTS

| | | | |
|---|---|---|---|
| 4,602,815 | 7/1986 | Boots et al. | 296/222 |
| 4,877,285 | 10/1989 | Huyer | 296/216 |
| 4,893,869 | 1/1990 | Fuerst | 296/220 |
| 4,921,298 | 5/1990 | Reuber et al. | 296/221 |
| 4,978,165 | 12/1990 | Schreiter et al. | 296/216 |
| 5,228,743 | 7/1993 | Regner | 296/223 |

FOREIGN PATENT DOCUMENTS

265020  11/1987  Japan .

*Primary Examiner*—Dennis H. Pedder
*Attorney, Agent, or Firm*—Krass & Young

[57] ABSTRACT

A sunroof assembly of the lift-up type in which the panel assembly is movable between closed, vent, and opened positions. The cam member coacting with the panel assembly to impart lifting movement to the panel assembly is arranged to undergo angular movement about the longitudinal axis of the track on which the cam member is mounted so that the resultant vertical movement imparted to the panel includes a component corresponding to the vertical rise of the cam member cam surface and a further augmenting component attributable to the angular movement of the cam member. The lifting device employs a U-shaped lever structure with a central hinge portion hinged to an edge of the panel assembly, a relatively short front lever arm portion received in a front shoe slidably and rotationally mounted on an inboard track surface, and a relatively long rear lever arm structure passing through a slot in the cam member and received at its outboard end in a rear shoe slidably and rotationally received on an outboard track surface. As the panel is moved between its closed and vent positions the forward edge of the panel is moved up slightly to break the seal with the roof opening and the panel portion rearwardly of the front edge is moved upward a greater amount to impart to the desired tilt to the panel assembly.

21 Claims, 8 Drawing Sheets

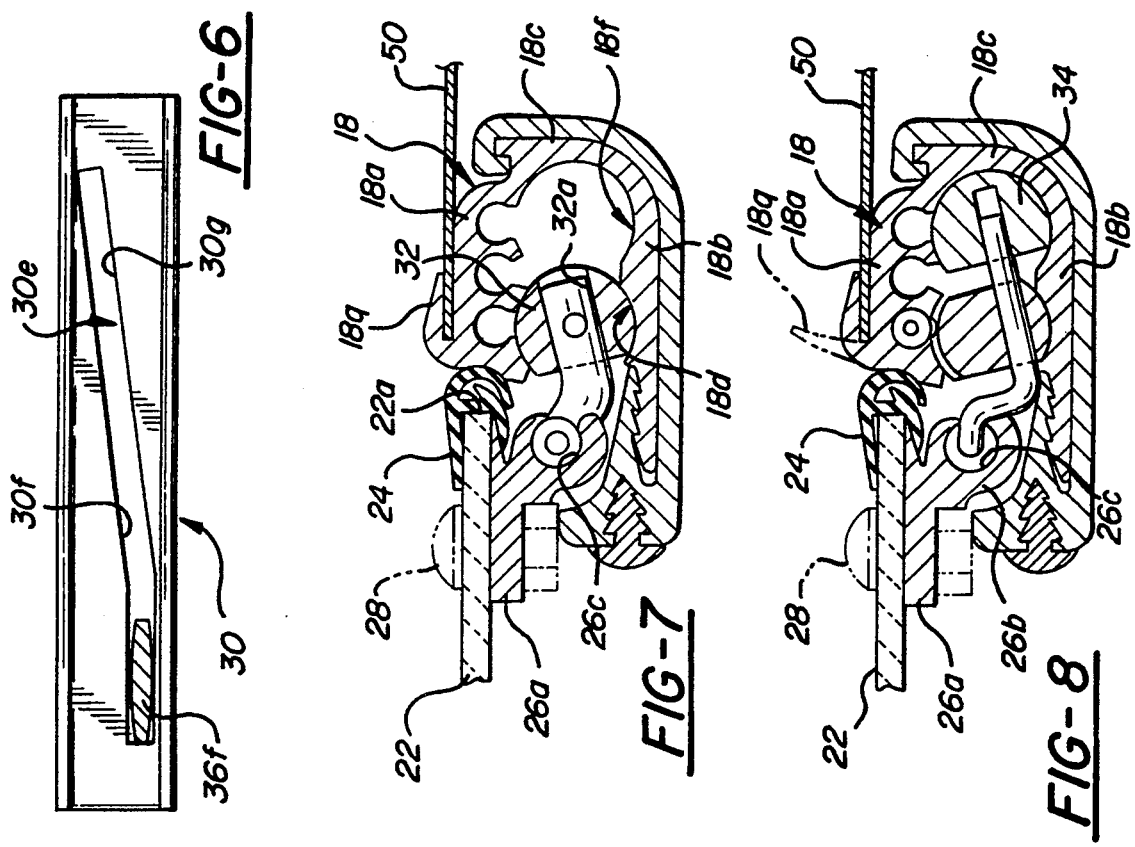
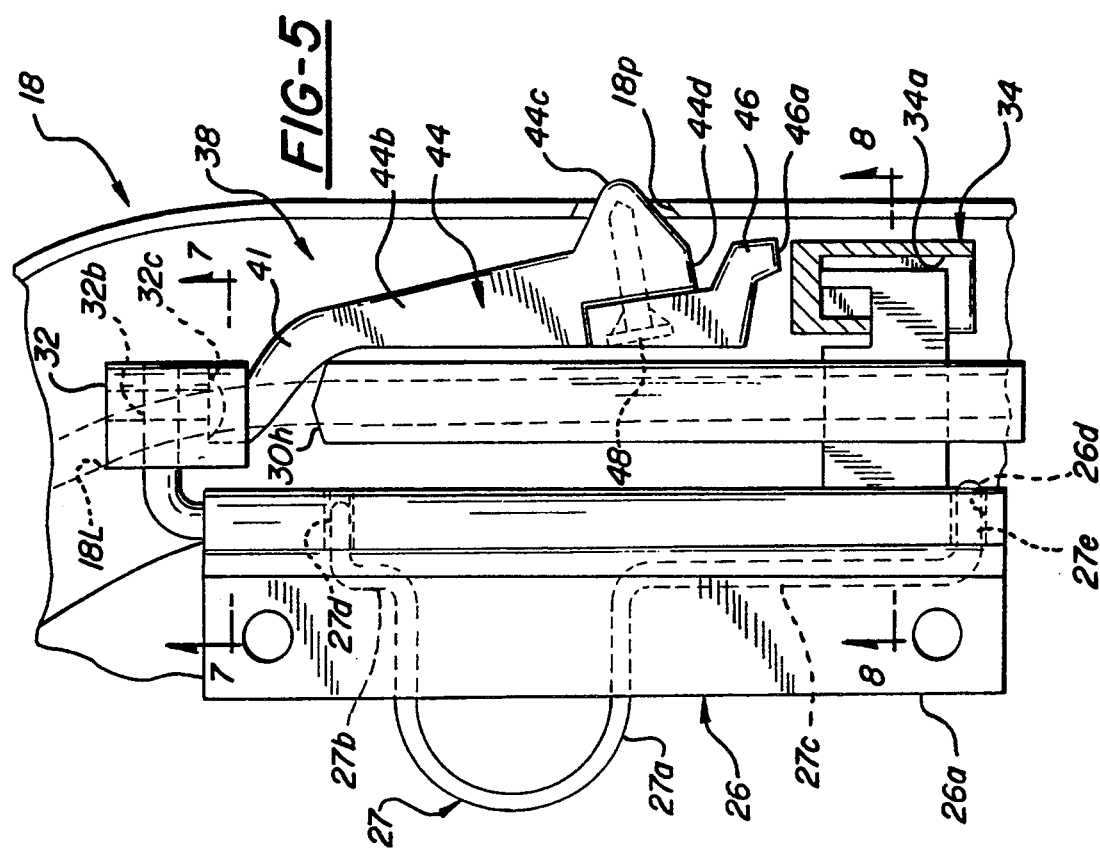

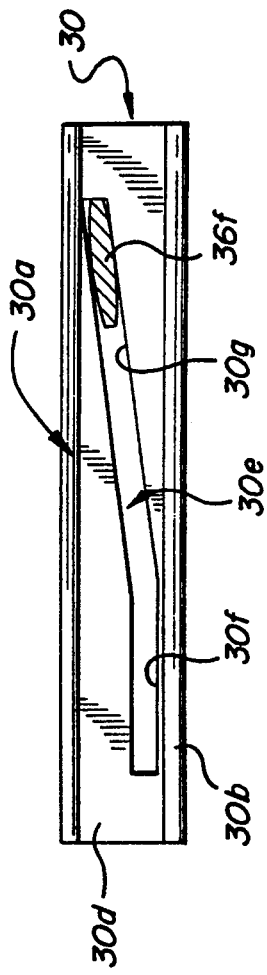
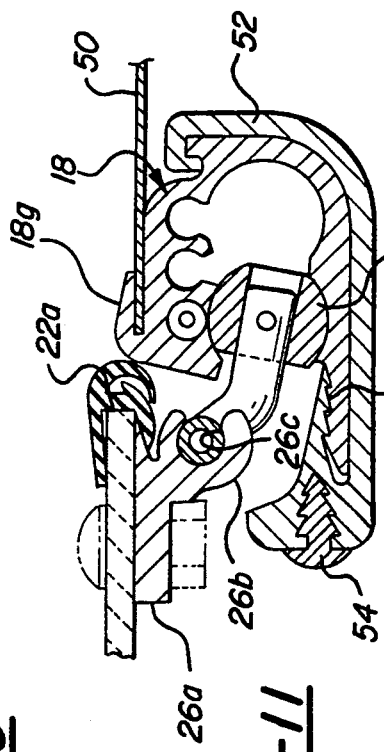
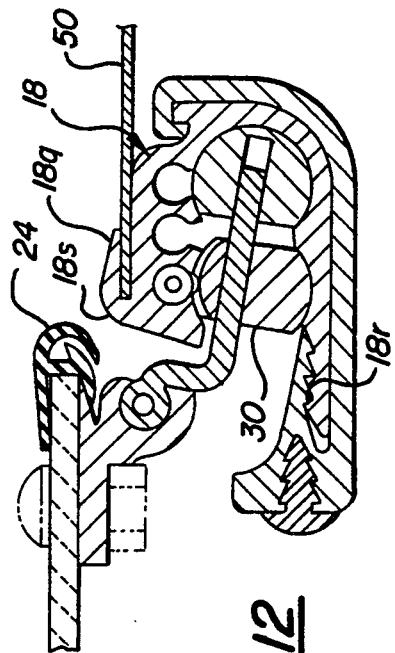
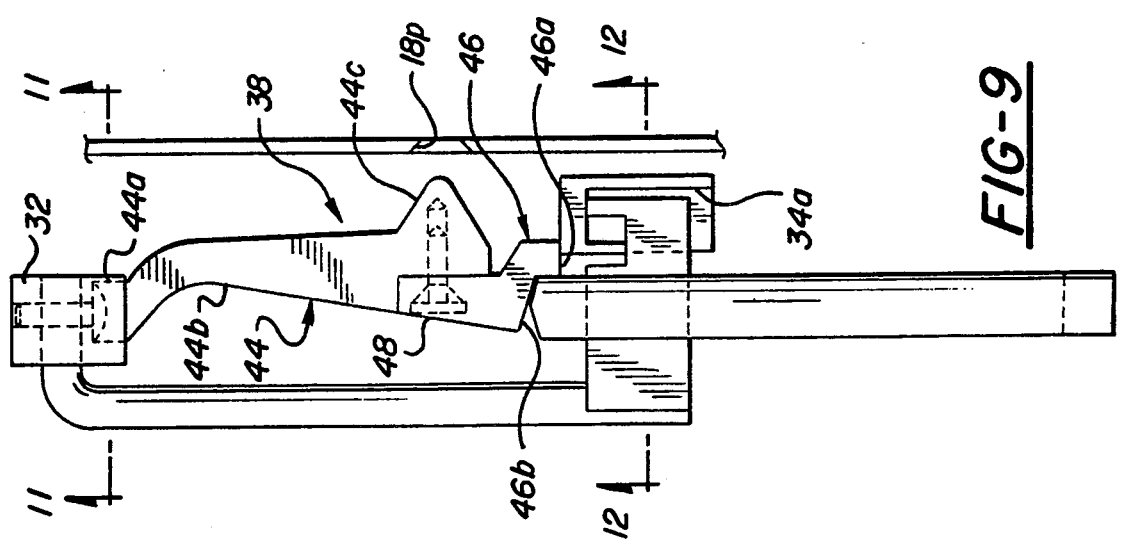

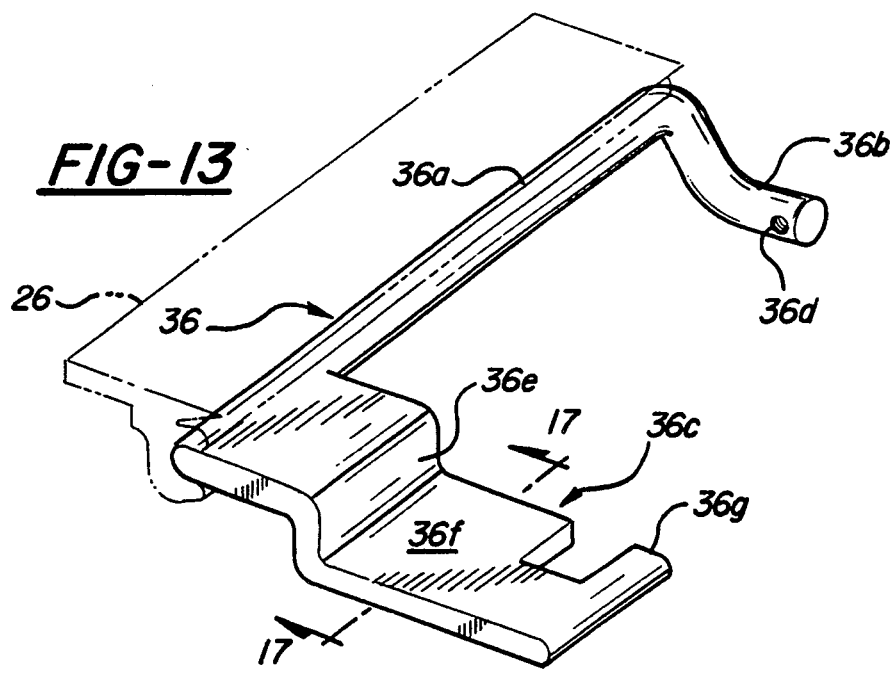
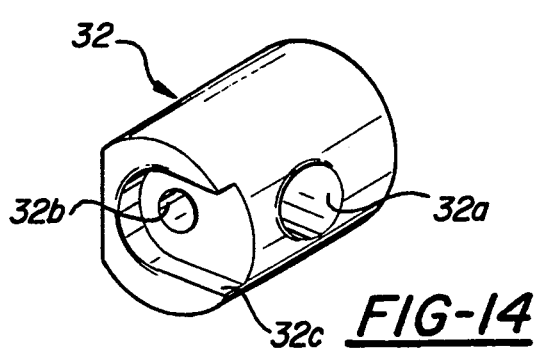
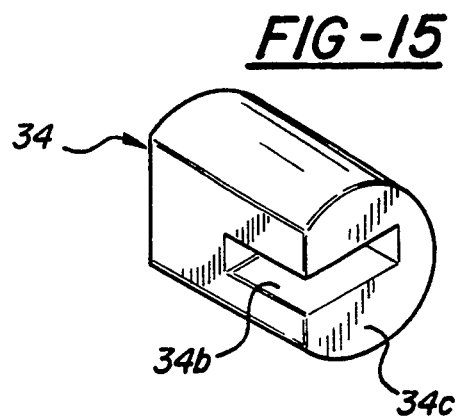
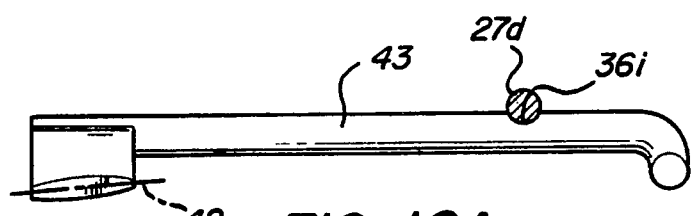
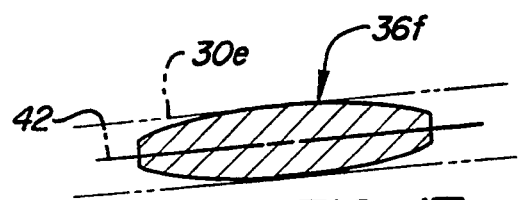
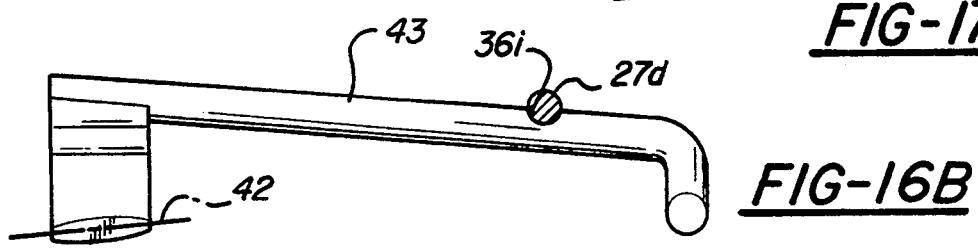

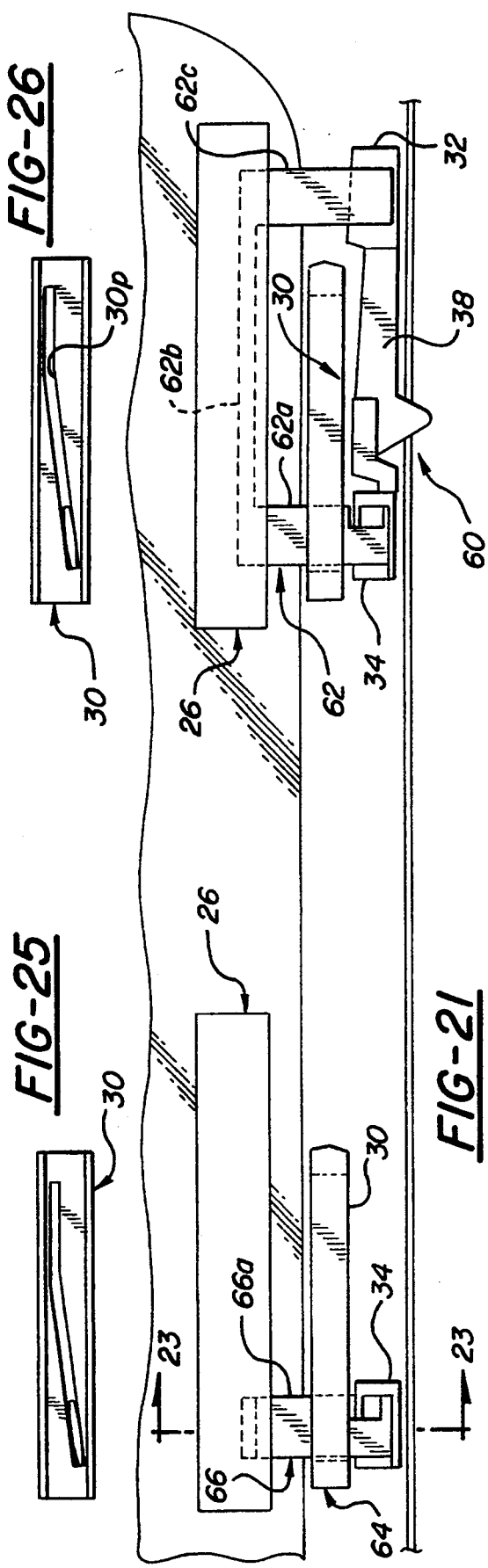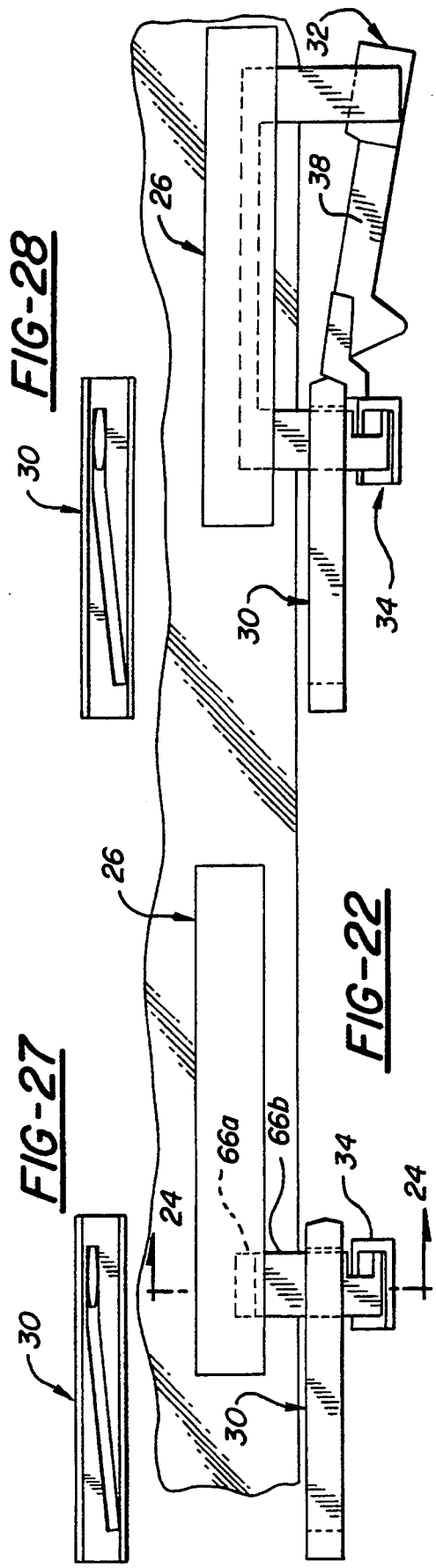

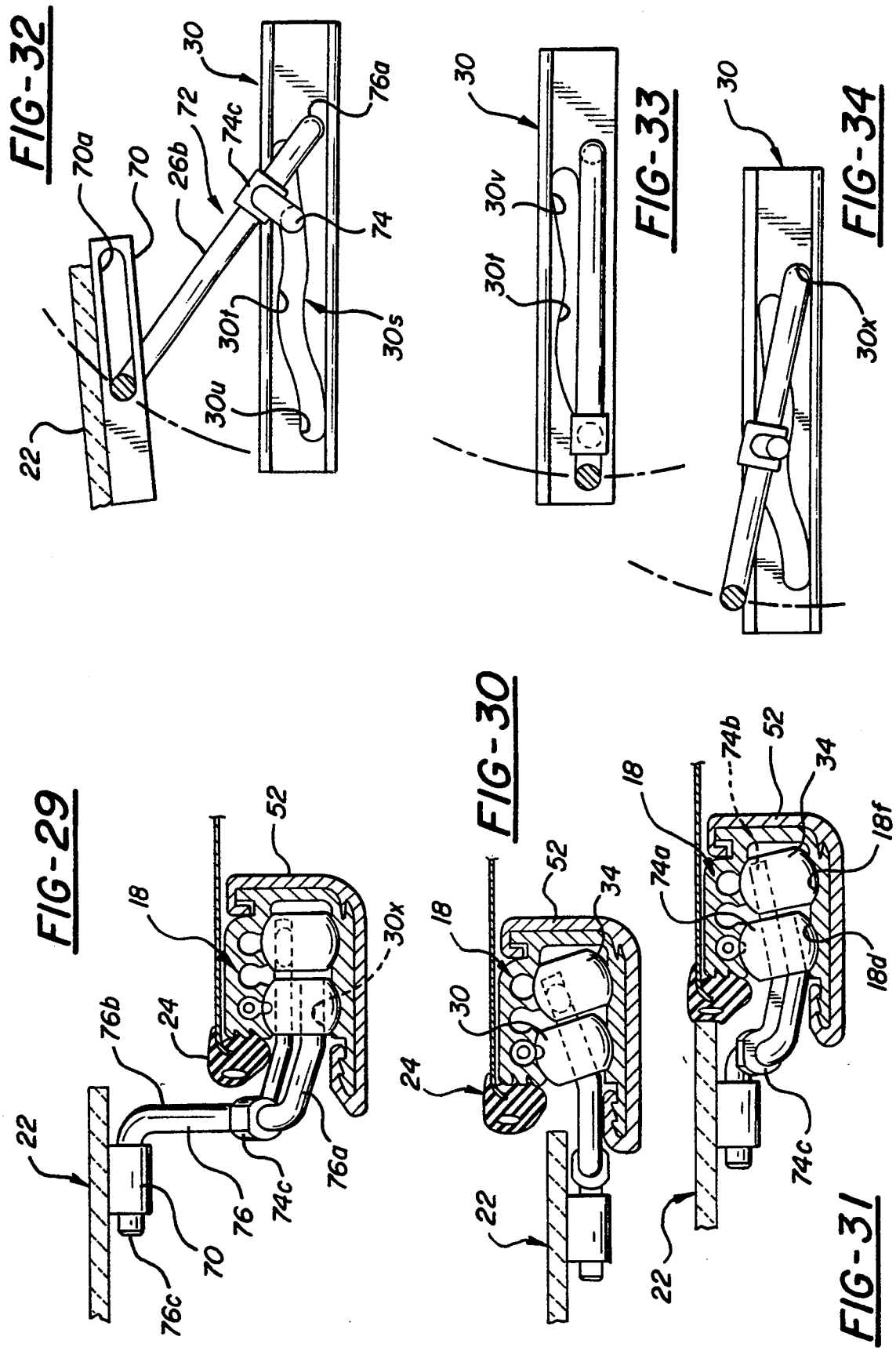

SUNROOF ASSEMBLY

BACKGROUND OF THE INVENTION

This invention relates to motor vehicle sunroofs and more particularly to improvements in the mechanisms utilized to move the sunroofs between various positions relative to the opening in the roof of the associated motor vehicle.

The present invention has particular applicability to motor vehicle sunroofs of the lift-up type, commonly called "spoiler" sunroofs. A lift-up or spoiler sunroof is one that moves from a closed position with respect to the roof opening into an upwardly and rearwardly tilted vent position and then is moved into a fully open position with a generally rectilinear rearward movement so that in the fully open position, the sunroof extends in upwardly and rearwardly tilted relation above a portion of the roof rearwardly of the roof opening.

Spoiler type sunroofs present a particular problem in the construction of the moving mechanism for moving the sunroof assembly between its various positions since the sunroof must be totally supported at its forward portion in order to enable as much as possible of the sunroof to extend rearwardly over the vehicle roof when in the fully open position.

In a typical sunroof assembly, the forward end of the sunroof is mounted for both pivotal and sliding movement. Whereas many designs of spoiler sunroof assemblies have been proposed and produced, and whereas the various prior art spoiler sunroof assemblies have proven to be generally satisfactory, each of the various prior art assemblies has embodied one or more disadvantages. Specifically, prior art assemblies have been unduly complicated with the result that they are expensive to produce, difficult to install, subject to a high repair frequency, and relatively expensive to repair. Further, the seal life has been severely limited by the tight sealing engagement of the forward end of the roof panel with the roof in the tilted position. Further, specific sunroof designs have been dedicated to a specific vehicle roof environment so that each vehicle roof must be customized to receive the sunroof assembly. Further, the prior art lift mechanisms have been unduly bulky, particularly with regard to thickness, with the result that they have detracted from the head room available in the vehicle.

SUMMARY OF THE INVENTION

This invention is directed to the provision of an improved lift assembly for a motor vehicle sunroof.

More specifically, this invention is directed to the provision of an improved lift assembly for a motor vehicle sunroof which provides for a longer seal life.

This invention is further directed to the provision of am improved lift assembly for a sunroof that facilitates ease of installation and repair.

This invention is further directed to the provision of an improved lift assembly for a sunroof which is readily adaptable for installation in a wide variety of vehicle roof configurations.

This invention is further directed to the provision of an improved sunroof lift assembly that has a minimum overall thickness so as to minimize intrusion on the vehicle head room.

This invention is further directed to the provision of an improved sunroof lift assembly that is extremely inexpensive to produce and extremely reliable in operation.

The invention lift-up sunroof assembly is of the type including a frame adapted to fit in an opening in the roof of the vehicle and defining a track positioned along one longitudinal side edge of the opening, a panel sized to fit within the frame to close the roof opening, a cam member slidably mounted on the track and defining a longitudinally extending cam surface, and a lever arm connected at an inboard end thereof to the panel and having a portion outboard of the inboard end cammingly engaging the cam member cam surface and operative in response to sliding movement of the cam member on the track to move the panel between open and closed positions as the cam member cam surface moves slidably along the lever arm cam portion.

According to the invention, the cam member undergoes angular movement about the longitudinal axis of the track as it slides longitudinally on the track so that the resultant vertical movement imparted to the panel by the inboard end of the lever arm includes a component corresponding to the vertical rise of the cam member cam surface and a further component attributable to the angular movement of the cam member. This arrangement allows a given amount of vertical movement to be imparted to the panel with a minimum thickness of cam member.

According to a further feature of the invention, the track on which the cam member is mounted for sliding and angular movement comprises an inboard track, the frame further defines an outboard track, the sunroof assembly further includes a shoe slidably mounted on the outboard track, the cam portion of the lever arm is intermediate the inboard and the outboard ends of the lever arm, and the outboard end of the lever arm is received in the shoe. This specific arrangement facilitates the angular movement of the cam member to augment the lifting movement of the panel as the cam member slides along the track.

According to a further feature of the invention, the shoe is further mounted on the outboard track for angular movement about the longitudinal axis of the outboard track. This arrangement further facilitates the angular movement of the lever arm.

According to a further feature of the invention, the lever arm comprises a rear lever arm portion of a U-shaped lever structure, the shoe comprises a rear shoe, the lever structure further includes a front lever arm portion and a central-hinge portion extending parallel to the tracks and pivotally received in a hinge surface defined along the adjacent longitudinal edge of the panel, the sunroof assembly further includes a front shoe slidably mounted on the inboard track forwardly of the rear shoe, and the outboard end of the forward lever arm portion is received in the front shoe. This arrangement provides a relatively small lifting movement to the forward end of the panel and a relatively large lifting movement to a portion of the panel disposed rearwardly of the forward end of the panel so as to define the tilted position of the panel while simultaneously relieving stresses on the seal interface between the panel and the frame proximate the forward end of the panel.

According to a further feature of the invention, the sunroof assembly further includes a cable drivingly connected to the cam member and operative to move the cam member slidably along the track and the driving connection between the cable and the cam member allows angular movement of the cam member about the longitudinal axis of the track. In the disclosed embodiment of the invention, the driving connection between the cam member and the cable comprises gear teeth along the cable intermeshing with gear teeth along the cam member.

According to a further feature of the invention, the cam member is elongated and defines a longitudinally extending cam slot and the rear lever arm portion of the lever structure extends transversely outwardly from the rear end of the hinge portion and passes through the slot in the cam member for receipt at its outboard end in the rear shoe.

BRIEF DESCRIPTION OF THE DRAWINGS

FIG. 5 is a fragmentary somewhat schematic plan view showing the sunroof assembly in closed position;

FIG. 6 is a view of a cam member utilized in the invention sunroof assembly;

FIGS. 7 and 8 are cross-sectional views taken respectively on lines 7—7 and 8—8 of FIG. 5;

FIG. 9 is a fragmentary somewhat schematic plan view of the sunroof assembly in the vent position;

FIG. 10 is a further view of the cam member;

FIGS. 11 and 12 are cross-sectional views taken on lines 11—11 and 12—12 of FIG. 9;

FIG. 13 is a perspective view of a lever structure employed in the invention sunroof assembly;

FIGS. 14 and 15 are perspective views of shoes employed in the invention sunroof assembly;

FIGS. 16A and 16B show the movement of the lever structure as the assembly is moved from its closed to its vent position;

FIG. 17 is a cross-sectional view taken on line 17—17 of FIG. 13;

FIG. 21 is a fragmentary plan view of a further embodiment of the invention sunroof assembly;

FIG. 22 is a view similar to FIG. 21 but showing the sunroof assembly of FIG. 21 in a lowered position;

FIGS. 25–28 are detail views of a cam member utilized in the embodiment of FIGS. 21–24;

FIGS. 29–31 are cross-sectional views of a still further embodiment of the invention sunroof assembly; and FIGS. 32–34 are diagrammatic side elevational views corresponding respectively to the cross-sectional views of FIGURES 29–31.

DETAILED DESCRIPTION OF THE PREFERRED EMBODIMENT

Figure 1:
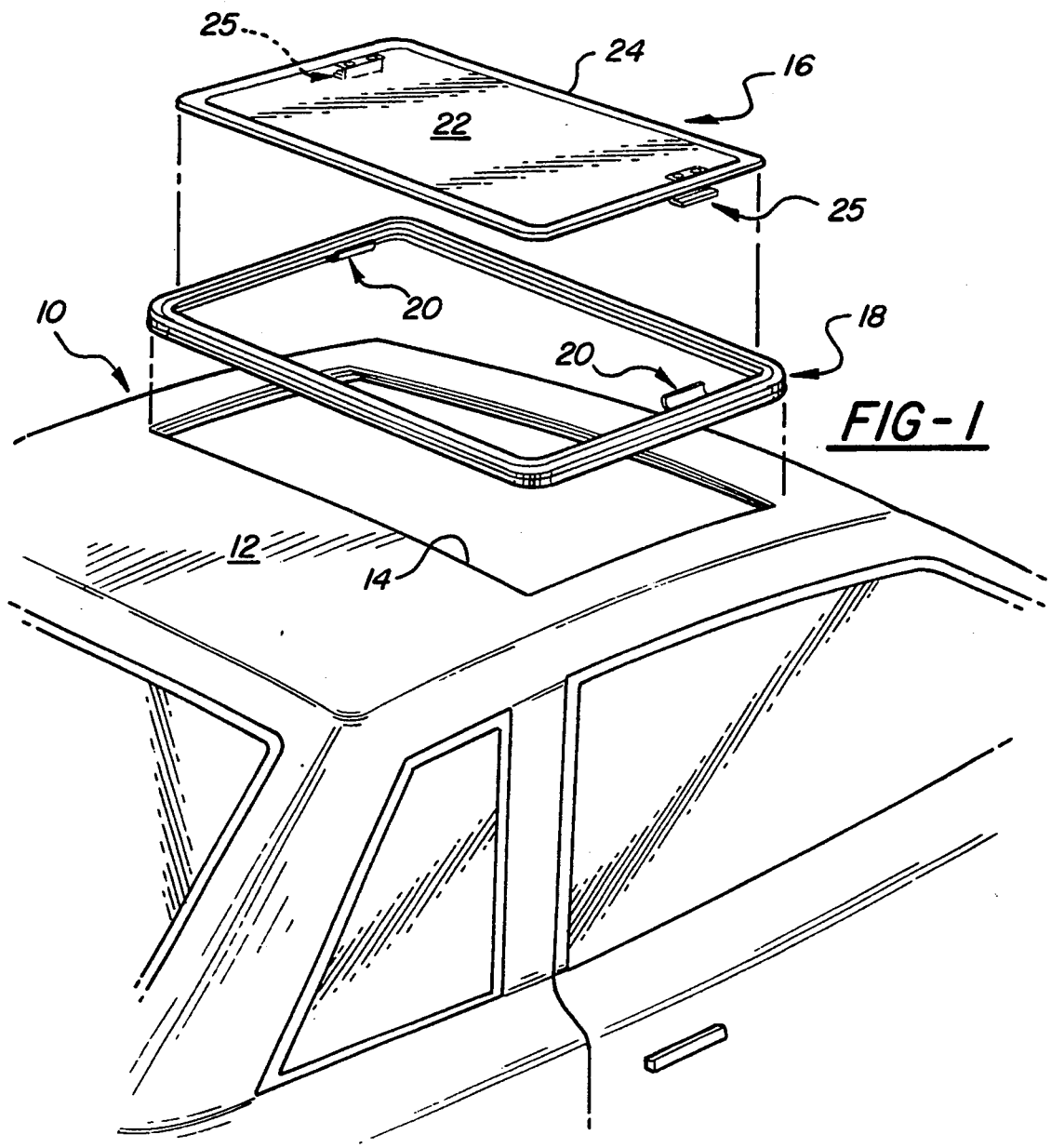
FIG. 1 is an exploded fragmentary perspective view of the invention sunroof assembly shown in association with an opening in the roof of a motor vehicle.
Figure 2:
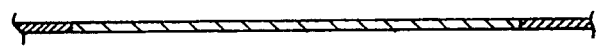
FIGS. 2, 3, and 4 show, respectively, the closed, vent, and open positions of the sunroof assembly.
Figure 3:
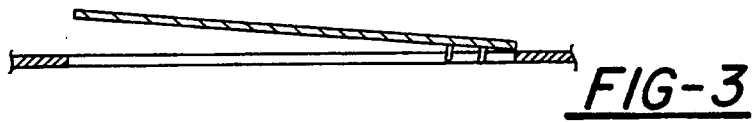

The invention sunroof assembly of the FIGS. 1–20 embodiment is seen in FIG. 1 in association with a motor vehicle 10 including a roof 12 defining a generally rectangular roof opening 14 overlying the front passenger compartment of the vehicle.

The sunroof assembly, broadly considered, includes a panel assembly 16, a frame 18, and a lift assembly 20. It will be understood that frame 18 is sized to fit within opening 14, panel assembly 16 is sized to fit within frame 18, and lift assembly 20 is operative to move the panel assembly between its closed, tilt, and open positions. Although the lift assembly 20 will be hereinafter described with reference to a lift assembly provided on the right forward edge of the sunroof assembly, it will be understood that a mirror image assembly 20 is provided on the left forward edge of the assembly so that the panel assembly 16 is operatively interconnected to the frame by left and right lift assemblies 20.

Panel assembly 16 includes a glass panel 22 of rectangular configuration, an annular seal 24 positioned around the circumference 22a of the panel and formed of suitable elastomeric material, and left and right hinge plate assemblies 25 secured respectively to the underface of the glass panel 22 proximate the left and right forward regions of the panel. The invention will be described with respect to the right hinge plate assembly 25 coacting with the right lift assembly 20.

Hinge plate assembly 25 (FIGS. 5, 7, 8, and 13) includes a hinge plate 26 and a release handle 27.

Hinge plate 26 has a generally rectangular configuration and may be formed as an aluminum extrusion. Plate 26 includes a rectangular main body portion 26a positioned against the underface of the glass panel 22 and secured to the glass panel as by bolts 28, and an outboard hinge portion 26b depending downwardly from main body portion 26a proximate the outboard edge of the hinge plate and defining an arcuate hinge surface 26c proximate the right-hand edge of the glass panel 22 and extending generally parallel and beneath the right-hand edge 22a of the glass panel.

Release handle 27 is formed of a configured bar stock and includes a handle portion 27a, axial portions 27b and 27c, and front and rear lock portions 27d and 27e. With the associated hinge plate 26 positioned against the underface of the glass panel, handle 27 is positioned beneath the main body portion 26a of the hinge plate with lock portions passing transversely outwardly through slots 26d in hinge plate hinge portion 26b.

Frame 18 (FIGS. 7, 8, 11, 12, and 18) has a generally rectangular overall configuration conforming to roof opening 14 and to the rectangular configuration of panel assembly 16 and may be formed as an aluminum extrusion. Frame 18 has a generally U-shaped cross-sectional configuration including an upper portion 18a, a lower portion 18b, and an outboard side wall portion 18c. The interior of frame 18 is configured to define an inboard longitudinally extending track surface 18d and an outboard longitudinally extending track surface 18f each having a generally arcuate or circular configuration. Specifically, inboard track surface 18d is defined by an upper arcuate surface 18g and a lower arcuate surface 18h and outboard track surface 18f is defined by an upper arcuate surface 18i, a lower arcuate surface 18j, and an outboard arcuate surface 18k. Upper frame portion 18a further defines a plurality of parallel and circular channels 18l, m, and n opening downwardly in the interior of the frame.

Lift assembly 20 includes a cam member 30, a front shoe 32, a rear shoe 34, a lever structure 36, and a lock assembly 38.

Cam member 30 (FIGS. 6, 10, and 19) has an elongated bar configuration and includes an upper arcuate surface 30a, a lower arcuate surface 30b, and flat side faces 30c and 30d. Cam member 30 defines a longitudinally extending cam slot 30e including a rear dwell portion 30f and a front rise portion 30g. Cam member 30 is sized to be mounted for sliding and angular movement in and along inboard track surface 18d with upper arcuate surface 30a interfacing with arcuate upper track surface 18g and lower arcuate surface 30b interfacing with lower arcuate track surface 18h. The cam member is thus mounted for sliding movement along track surface 18d as well as angular movement about the longitudinal axis of track surface 18d. Cam member 30 further includes gear teeth 30h formed along the upper arcuate surface 30a of the cam member and adapted for driving engagement with gear teeth 40a formed along a drive cable 40 positioned in channel 18l so that the cam member 30 is moved along the track 18d in response to manual or powered movement of the cable 40 with the intermeshing engagement of the cable teeth 40a and the cam member teeth 30h allowing angular movement of the cam member about the longitudinal axis of track surface 18d. Although cable 40 is shown herein as positioned in channel 18l, it will be understood that channels 18m and 18n may also be utilized to house the cable in other sunroof assembly installations.

Front shoe 32 (FIGS. 5, 7, and 14) has a generally cylindrical configuration and is sized to fit slidably and rotationally on inboard track surface 18d. Shoe 32 includes a through transverse bore 32a and a longitudinal bore 32b opening at the rear end thereof in a pocket 32c.

Rear shoe 34 (FIGS. 5, 8, and 15) has a generally cylindrical configuration and is sized to fit slidably and rotationally on inboard track surface 18f. Shoe 34 defines a central cavity 34a and further includes a longitudinally extending slot 34b opening in 34a and also opening in the rear end face 34c of the shoe.

Lever structure 36 (FIGS. 5, 13, 16A, and 16B); has a generally U-shaped configuration and includes a central hinge portion 36a, a front lever arm portion 36b, and a rear lever arm portion 36c. Central hinge portion 36a is sized to be received in hinge surface 26c of hinge plate 26 so as to provide a hinging action therebetween, and front lever arm portion 36b is sized to fit in transverse bore 32a of front shoe 32 with a pin 41 positioned in bore 32b and passing through a bore 36d in the front lever arm portion to couple the front lever arm portion 36b to the shoe 32. A-groove 36i in hinge portion 36a is sized to lockingly receive locking portion 27d of handle 27.

Rear lever arm portion 36c includes a downwardly cranked inboard-portion 36e integral with the rear end of the central hinge portion, a cam portion 36f, and an outboard hook portion 36g. Cam portion 36f is sized to fit slidably in cam slot 30e and, as seen in FIG. 17, has a rounded longitudinal cross-sectional configuration to facilitate sliding and rocking movement in cam member slot 30e. The sliding and rocking movement of the cam portion 36f in slot 30e is further facilitated by the canting of the axis 42 of cam portion 36f relative to the axis 43 of central hinge portion 36c. Hook portion 36g is sized to pass through slot 34b of rear shoe 34 to position the outboard end of rear lever arm portion in rear shoe 34 so as to couple the rear lever arm portion to the rear shoe.

Lock assembly 38 (FIGS. 5 and 9) includes a lock arm 44 and a lock finger 46. Lock arm 44 includes a cylindrical head portion 44a sized to fit in pocket 32c of front shoe 32, and a main body portion 44b including a locking prong portion 44c formed proximate the rearward end 44d of the arm. Lock finger 46 is secured to the forward end of lock arm 44 proximate prong portion 44c by a screw 48 and defines a rear locking finger portion 46a and a cam surface 46b. Prong 44c is sized to fit lockingly in an opening 18p formed in the outboard wall 18c of frame 18. It will be seen that locking lever assembly is positioned within the hollow of frame 18 for pivotal movement about its front end between a locking position, seen in FIG. 5, wherein the prong portion 44c coacts with frame opening 18p to preclude rearward movement of the lift assembly along the frame and an open position, seen in FIG. 9, in which prong portion 44c has been withdrawn from opening 18b to allow rearward movement of the lift assembly along the frame.

To install the invention sunroof assembly in a motor vehicle either on an OEM basis or an after-market basis, the roof opening 14 is formed in the roof of the vehicle; a separate hole is cut in the headliner of the vehicle; frame 18 is passed through the opening 14 and positioned beneath the opening whereafter it is moved upwardly to adhesively secure the upper portion 18a of the frame (utilizing for example, double sticky tape) to the underface of the roof skin 50; an inboard upwardly extending trim edge 18q of the frame is rolled over onto the upper face of the roof skin 50 in a suitable rolling operation to firmly secure the frame to the skin; and the headliner of the vehicle is trimmed and installed utilizing a trough 52 embracing the outboard and lower faces of the frame and including a serrated inboard portion 52a for coaction with serrations 18r on the inboard edge of the frame to secure the inboard edge of the trough to the inboard edge of the frame, whereafter the headlining may be installed utilizing screws 54. In installations where a rainwater drainage system is desired or required, the drainage system may be provided simply by piercing trough 52 and connecting the piercing trough to suitable drainage tubes. Following installation of the frame, panel assembly 16 may be inserted in the frame simply by moving handle 27 to its inboard retracted position, positioning the panel assembly in the frame with hinge surface 26c positioned around the hinge portion of lever structure 36, and moving handle 27 outboard to its locking position in which the front lock pin 27d lockingly engages in lever structure groove 36i and the rear lock portion 27e is positioned lockingly behind the rear end of the lever arm hinge portion.

To remove the sunroof assembly from the vehicle for repair or replacement, the panel assembly 16 is removed by retraction of handles 27; screw 48 is removed; locking assembly 38 is removed; rear shoe 34 is removed utilizing the slot interconnection between the rear shoe and the rear lever arm portion; pin 41 is removed; lever arm structure 36 is removed; and cam member 30 is twisted through 90° and removed from the frame.

With the sunroof assembly in its closed or locked position as seen in FIGS. 5–8, locking prong 44c is engaged in frame opening 18p to preclude rearward movement of the panel assembly. When it is desired to move the panel assembly from its closed to its vent position, cable 40 is suitably actuated to move cam member 30 slidably along inboard track 18d. As the cam member moves rearwardly along inboard track surface 18d, the cam portion 36c of the rear lever arm portion moves from the dwell portion 30f of the slot 30e upwardly along the rise portion 30g of the slot to impart a vertical movement to the lever structure (corresponding to the rise of rise portion 30g) and simultaneously undergoes rotation or angular movement with respect to the longitudinal axis of the inboard track surface (as seen by a comparison of FIGS. 8 and 12) to augment the vertical movement of the inboard end of the lever structure-and thereby augment the vertical movement of the panel assembly. The angular movement of the lever structure will be seen to be caused by and accommodated by the pivotal movement of the outboard end of the rear lever arm portion, along with rear shoe 34, about the longitudinal axis of outboard track surface 18f. As the portion of the panel assembly associated with the rear lever arm portion undergoes the relatively large amount of vertical movement as seen by a comparison of FIGS. 8 and 12, the forward portion of the panel assembly associated with the front lever arm portion 36b undergoes a relatively smaller vertical lifting movement which is caused by and accommodated by pivotal movement of front shoe 32 on inboard track 18d with the accompanying pivotal movement of the front lever arm portion 36b (as seen by a comparison of FIGS. 7 and 11). For example, inboard track surface 18d may be positioned 1.5 inches from the longitudinal axis of hinge portion 36a, outboard track surface 18e may be positioned 2.6 inches from the longitudinal axis of hinge portion 36a, the front end of the hinge portion 36a may undergo a lift of 0.02 inches, and the rear end of the hinge portion 36a may undergo a lift of 0.50 inches.

Figure 4:
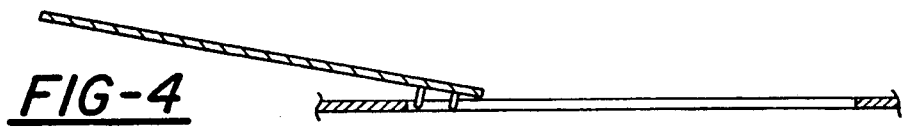
Figure 18:
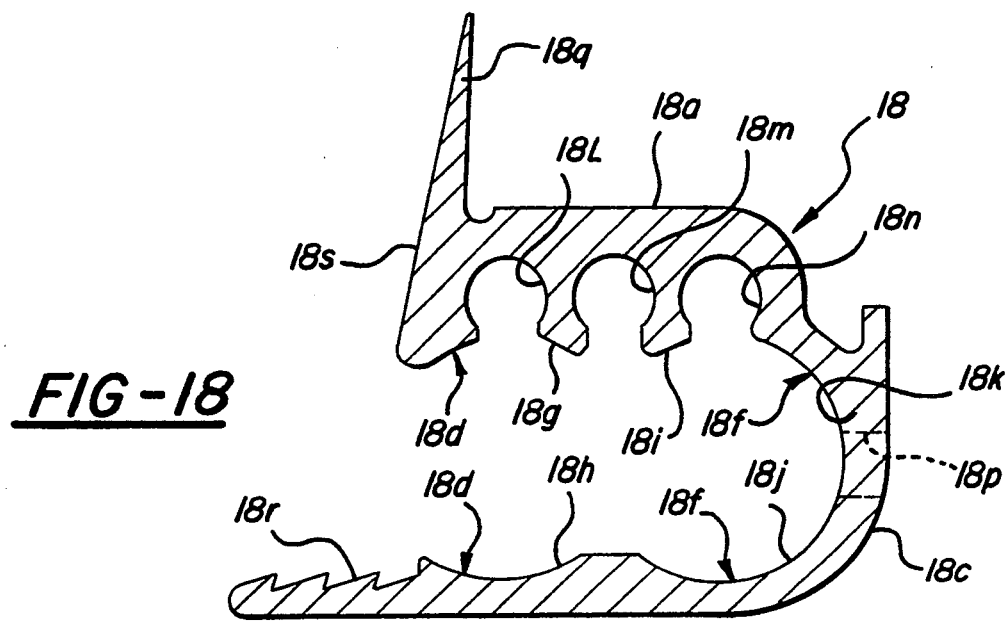
FIG. 18 is a cross-sectional view of a frame utilized in the invention sunroof assembly.
Figure 19:
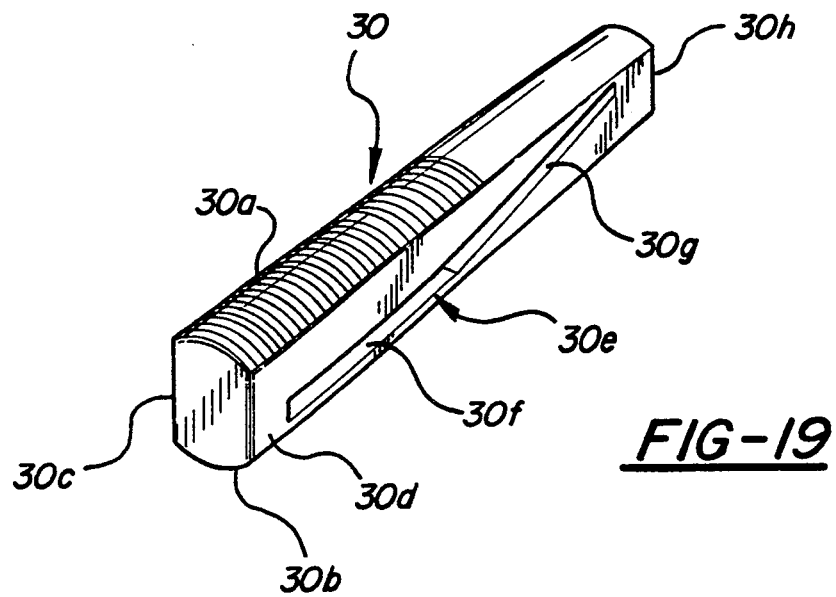
FIGS. 19 and 20 are further views of the cam member.
Figure 20:
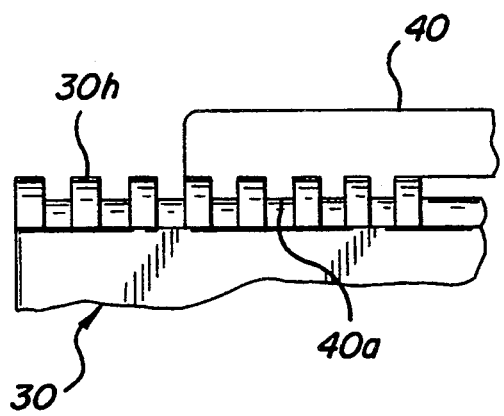
Figure 23:
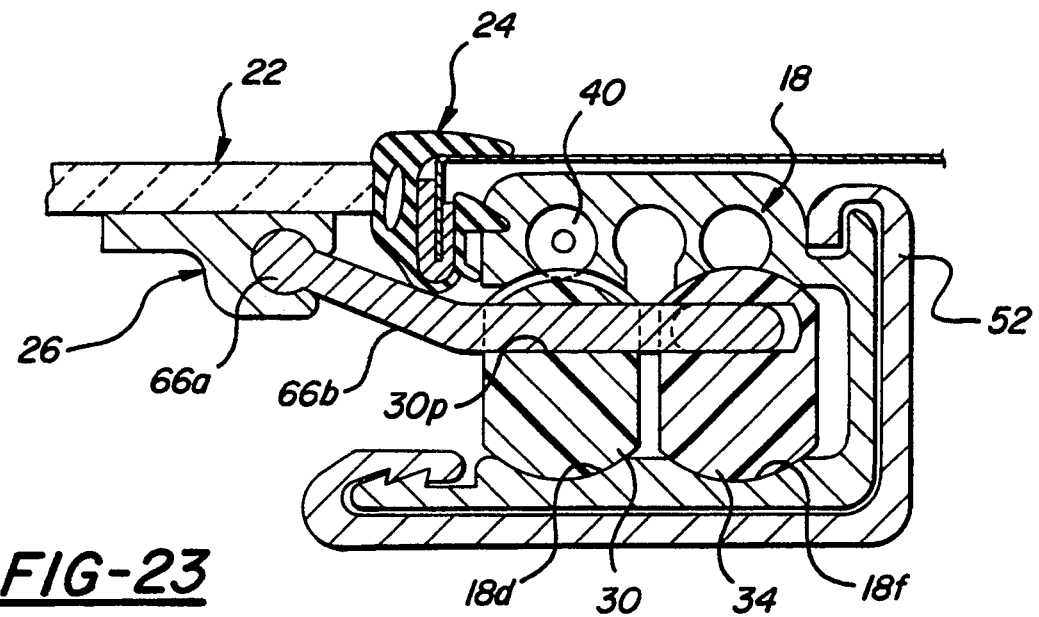
FIG. 23 is a cross-sectional view taken on line 21—21 of FIG. 21.
Figure 24:
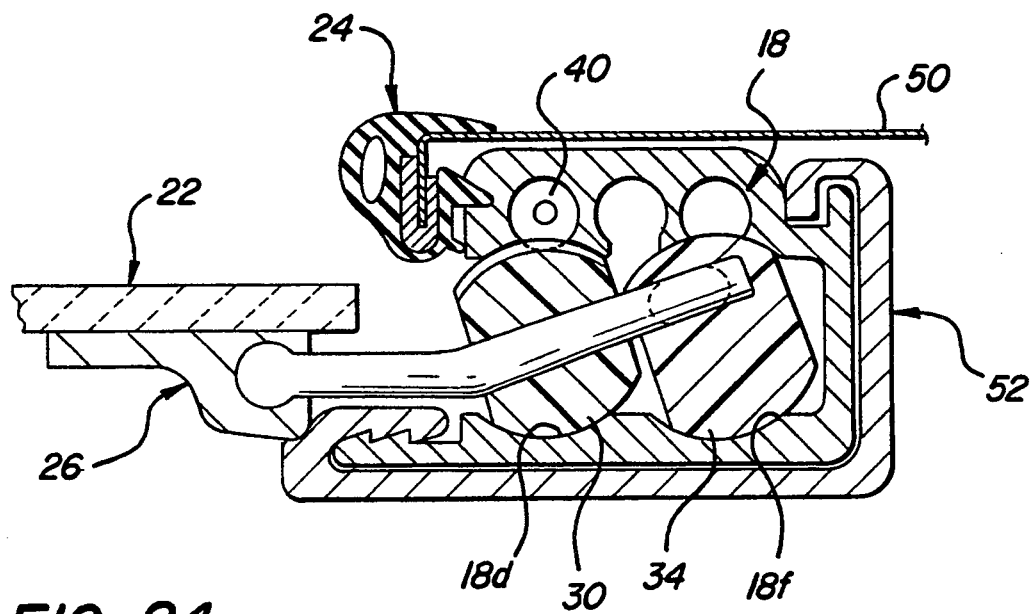
FIG. 24 is a cross-sectional view taken on line 22—22 of FIG. 22.

The relatively small lifting movement of the front end of the panel assembly has the effect of releasing seal 24 from engagement with the confronting inboard edge 18s of the upper portion 18a of the frame. With the roof assembly in the vent position, the parts assume the configuration seen in FIG. 9 wherein the cam portion of the rear lever arm portion is moved up the rise portion 30g of the slot 30e to the front end of the slot so that, with continued rearward movement of the cam member instigated by the cable 40, the panel assembly is carried along with the cam member by the engagement of the cam portion 36f in the forward end of the slot 30e so as move the panel assembly rearwardly to the open position as seen in FIG. 4. The movement of the panel assembly to the open position from the vent position is made possible by the movement of locking arm 44 to its open position as seen in FIG. 9 wherein the prong portion 44c has been retracted from the opening 18p of the frame so as to unlock the panel assembly for movement to the open position.

To move the panel assembly back to the vent and closed positions, cable 40 is moved in the reverse direction with the cam member and locking lever structure moving together as the panel assembly moves from the open to the vent position whereafter the forward end 30h of the cam member pushes cammingly on the rear edge 46b of the finger 46 to move locking prong 46c outwardly into locking coaction with frame opening 18p (as seen in FIG. 5) so as to allow the cam member to continue forwardly and move the panel assembly from its vent to its closed position by the interaction of the slot 30e and the rear lever arm portion of the lever structure.

The invention sunroof assembly will be seen to have many advantages. Specifically, since the lifting movement of the panel assembly includes a component corresponding to the vertical rise of the cam slot and a further augmenting component attributable to the angular movement of the cam member about the longitudinal axis of the track surface 18d, the thickness of the cam member for a given amount of desired vertical movement of the panel assembly may be minimized so as to in turn minimize the intrusion of the sunroof assembly into the interior of the vehicle and minimize the sacrifice of interior head room resulting from the installation of the sunroof assembly. For example, whereas a typical cam member utilizing only the cam rise to achieve the lifting action may have a thickness of 1¾ inches to provide a desired amount of lift, the cam member of the invention may have a thickness of only 1 inch to provide the same amount of desired lift.

Further, since the invention lift assembly operates to break the front seal of the panel assembly as the panel assembly is moved from its closed to its vent position, wear on the seal is greatly relieved with the result that seal life is greatly improved. Note in this regard that prior art lift assemblies have achieved a certain amount of lifting of the seal proximate the front end of the panel assembly, but only at the expense of providing a pivot axis for the panel assembly substantially forwardly of the forward end of the opening with resultant tear-up of the roof structure of the vehicle and with resultant requirements for customizing each individual installation.

Further, the invention lift assembly requires relatively few parts and is therefore producible at a relatively low cost; is readily installable in the vehicle roof opening so as to minimize installation costs; and is readily removable from the roof opening for replacement or repair so as to minimize repair and replacement costs.

The invention sunroof assembly of the FIGS. 21-28 embodiment incorporates many of the features of the FIGS. 1-20 embodiment and as such includes a frame 18 defining an inboard track surface 18d and an outboard track surface 18f, and a trough 52 embracing the outboard and lower faces of the frame. However, the embodiment of FIGS. 19-26 includes front and rear lift assemblies, rather than the single front lift assembly of the FIGS. 1-18 embodiment, seal 24 is provided on the inboard edge of the frame 18 rather than on the outboard edge of the panel 22, and the sunroof assembly is intended to be moved between a closed position seen in FIGS. 21 and 23, a lowered position seen in FIGS. 22 and 24, and a stowed position (not illustrated) in which the panel assembly of the sunroof has been moved rearwardly from its lowered position to position it beneath the roof of the vehicle rearwardly of the sunroof opening.

The front lift assembly 60 is generally similar to the lift assembly 20 of the FIGS. 1-20 embodiment and as such includes a cam member 30, a front shoe 32, a rear shoe 34, a lock assembly 38, and a lever structure 62. Lever structure 62 is generally similar to the lever structure 36 of the FIGS. 1-20 embodiment and as such includes a rear arm portion 62a passing outwardly through a cam slot 30p in the cam member 30 for engagement with rear shoe 34 slidably mounted on track 18f, a central hinge portion 62b pivotally mounted in hinge plate 26 secured to the underface of the glass panel 22, and a front arm portion 62c. However, front arm portion 62c has a length corresponding to the length of rear arm portion 62a and front shoe 32 is slidably mounted on outboard track 18f rather than on inboard track 18d so that as the cam member 30 is slid in track 18d the upward movement of the hinge portion 62b resulting from the fall of cam slot 30p and the pivotal movement of the cam member 30 on the track 18d results in equal vertical movement of the front and rear ends of the lever structure 62 so that the associated panel undergoes a translatory rather than a pivotal vertical movement, in this case a lowering movement as seen by a comparison of the closed panel position of FIG. 21 and the lowered panel position of FIG. 24.

Rear lift assembly 64 includes a cam member 30 having a cam slot 30p, a shoe 34 corresponding to the rear shoe 34 of the front lift assembly 60, and an arm 66. Arm 66 corresponds generally to the rear arm portion 62a of lever structure 62 and includes an inboard hinge portion 66a pivotally mounted in hinge member 26, and a main body portion 66b passing outwardly through cam slot 30p in cam member 30 for engagement with shoe 34.

In the operation of the sunroof assembly of the FIGS. 21–28 embodiment, the front and rear cam members 30 are moved simultaneously, as by a cable 40 received in a groove in the frame member. As the cam members undergo simultaneous rearward movement from the position seen in FIG. 21, the lift assemblies 60 and 64 coact to translatorily lower the panel from the closed position seen in FIG. 23 to the lowered position seen in FIG. 24 with the lowering movement at each lift assembly comprising a combination of a fall of the cam slot 30p of the cam member and a rotational or angular movement of the cam member in the respective track. It will be understood that, following movement of the panel to the lowered position of FIG. 22, the entire sunroof assembly may be slid rearwardly to a position in which the panel is stored rearwardly of the sunroof opening and beneath the roof structure of the vehicle.

The sunroof assembly embodiment seen in FIGS. 29–34 also includes a frame 18 defining an inboard track surface 18d and an outboard track surface 18f; a trough 52 embracing the frame; a cam member 30 slidably and rotationally mounted on inboard track surface 18d; a shoe 34 slidably mounted on outboard track surface 18f; and a glass panel 22.

However, as with the FIGS. 21–28 embodiment, seal 24 is carried on the inboard edge of frame 18 rather than on the outboard edge of panel 22; the cam slot in cam member 30 is a compound slot 30s comprising a central lock portion 30t, a forward portion 30u, and a rearward portion 30v; the hinge plate 70 secured to the underface of the glass panel 22 defines a slot 70a; and the lift assembly 72 includes a lift arm 74 and an elevator or extender rod 76.

Lift arm 74 includes a main body portion 74a passing through the cam slot 30s in the cam member, an outboard portion 74b coacting with shoe 34, and an inboard socket portion 74c.

Elevator rod 76 includes an outwardly extending rear end portion 76a pivotally mounted in a bore 30x in the rear end of the cam member 30, a main body portion 76b passing with a sliding swivel connection through socket portion 74c of lift arm 74, and an inwardly extending forward portion 76c received in slot 70a of hinge plate 70. The lift assembly is intended to move the panel assembly between a closed position seen in FIG. 31, a raised vent position seen in FIG. 29, and a lowered position seen in FIG. 30. The movement of the panel between its various positions is accomplished by sliding movement of cam member 30 along track surface 18d. Specifically, with the main body portion 74a of the lift arm 74 occupying the central or dwell position 30t of the cam slot 30s the panel assembly is in its locked or closed position; when the cam member is moved forwardly the panel assembly is moved to the raised vent position, and when the cam member is moved rearwardly the panel assembly is moved to its lowered position.

As the panel assembly is moved from its closed to its raised vent position, the upward movement of the panel assembly includes three components including a first component corresponding to the rise of the cam slot between locations 30t and 30v, a second component attributable to the rotation of the cam member on the track 18d, and a third component attributable to the mechanical advantage achieved by virtue of the interconnection between the arm 74 and the extender rod 76 and, specifically, by virtue of the large amount of upward pivotal movement imparted to the front end 76c of the extender rod in response to a relatively small amount of upward pivotal movement imparted to the portion of the extender rod engaging the swivel portion 74c of the lift arm. The arrangement of FIGS. 27–32 will thus be seen to provide an extremely large amount of upward movement of the panel assembly for a relatively small amount of cam rise of the cam member so that a relatively low height cam member may be utilized to achieve a large amount of vertical movement of the panel assembly.

The arrangement of the FIGS. 29–34 embodiment makes it possible for a relatively low height cam to achieve vertical movement of the panel assembly sufficient to provide the raised vent position of FIG. 27 as well as the lowered position of FIG. 28 with the movement between the extreme upper and lower positions, as noted, comprising a three-part movement including the cam rise component, the rotational component suitable to the rotation of the cam member on the track surface, and the mechanical advantage component attributable to the levering action of the lift arm with respect to the elevator rod. As with the embodiment of FIGS. 21–28 (and utilizing a mechanism not shown) the panel assembly 22 may be slid rearwardly from the lowered position of FIG. 30 to a position beneath the roof of the vehicle and behind the sunroof opening. It will further be understood that further guide means (not shown) would be utilized in conjunction with the described lift assembly to guide the panel in its movement between its various positions as well as to guide the panel as it slides rearwardly to its stowed position beneath the roof.

Whereas preferred embodiments of the invention has been illustrated and described in detail, it will be apparent that various changes may be made in the disclosed embodiment without departing from the scope or spirit of the invention.

I claim:

1. A lift-up sunroof assembly for a motor vehicle including a frame adapted to fit in an opening in the roof of the vehicle and defining a track positioned along one longitudinal side edge of the opening, a panel sized to fit within the frame to close the roof opening, a cam member slidably mounted on the track and defining a longitudinally extending cam surface, and a lever arm operatively associated at an inboard end thereof with the panel and having a portion outboard of the inboard end cammingly engaging the cam member cam surface and operative in response to sliding movement of the cam member on the track to move the panel between opened and closed positions as the cam member cam surface moves slidably along the lever arm cam portion, characterized in that:

the sunroof assembly further includes means operative to impart angular movement to the cam member about a longitudinal axis of the track as the cam member slides longitudinally on the track so that the resultant vertical movement imparted to the panel by the inboard end of the lever arm includes a component corresponding to the vertical rise of the cam member cam surface and a further component attributable to the angular movement of the cam member.

2. A sunroof assembly according to claim 1 wherein: the track on which the cam member is mounted for sliding and angular movement comprises an inboard track, the frame further defines an outboard track, the cam portion of the lever arm is intermediate the inboard and the outboard ends of the lever arm, and the operative means includes a shoe slidably mounted on the outboard track with the outboard end of the lever arm received in the shoe.

3. A sunroof assembly according to claim 2 wherein: the shoe is further mounted on the outboard track for angular movement about the longitudinal axis of the outboard track.

4. A sunroof assembly according to claim 2 wherein: the lever arm comprises a rear lever arm portion of a U-shaped lever structure, the shoe comprises a rear shoe, the lever structure further includes a central hinge portion extending parallel to the tracks and pivotally received in a hinge surface defined along the adjacent longitudinal edge of the panel and a front lever arm portion, the sunroof assembly further includes a front shoe slidably mounted on the inboard track forwardly of the rear shoe, and an outboard end of the forward lever arm portion is received in the front shoe.

5. A sunroof assembly according to claim 4 wherein: the front shoe is mounted for angular movement about the longitudinal axis of the inboard track.

6. A sunroof assembly according to claim 1 wherein: the sunroof assembly further includes a cable drivingly connected to the cam member and operative to move the cam member slidably along the track, the driving connection between the cable and the cam member allowing the angular movement of the cam member about the longitudinal axis of the track.

7. A sunroof assembly according to claim 6 wherein: the driving connection between the cam member and the cable comprises gear teeth along the cable intermeshing with gear teeth along the cam member.

8. A sunroof assembly according to claim 1 wherein: the assembly further includes an extender rod pivotally mounted at one end thereof on the cam member and connected at its other end to the panel; and the inboard end of the lever arm is connected to the extender rod at a location between the ends of the extender rod.

9. A sunroof assembly according to claim 8 wherein: the inboard end of the lever arm has a sliding connection to the extender rod.

10. A sunroof assembly according to claim 9 wherein: the other end of the extender rod is pivotally connected to the panel.

11. A sunroof assembly according to claim 10 wherein: the other end of the extender rod is received in a slot defined on the panel.

12. A sunroof assembly according to claim 1 wherein: the assembly includes an additional cam member slidably mounted on the track; an additional lever arm is associated with the additional cam member with the inboard end of the lever arms respectively associated with front and rear portions of the panel; and each cam member undergoes angular movement about the longitudinal axis of the track as it slides longitudinally on the track so that the resultant vertical movement imparted to the front or rear portion of the panel by the inboard end of the respective lever arm includes a component corresponding to the vertical rise of the respective cam member cam surface and a further component attributable to the angular movement of the respective cam member.

13. A sunroof assembly according to claim 12 wherein the track on which the cam members are mounted for sliding and angular movement comprises an inboard track, the frame further defines an outboard track, the sunroof assembly means operative to impart angular movement includes front and rear shoes slidably mounted on the outboard track, the cam portion of each lever arm is intermediate the inboard and the outboard ends of the lever arm, and the outboard ends of the lever arms are respectively received in the front and rear shoes.

14. A lift-up sunroof assembly for a motor vehicle including a frame adapted to fit in an opening in the roof of the vehicle and defining a track positioned along one longitudinal side edge of the opening, a panel sized to fit within the frame to close the roof opening, a cam member slidably mounted on the track and defining a longitudinally extending cam surface, and a lever structure operatively associated at an inboard end thereof with the panel and having a portion outboard of the inboard end cammingly engaging the cam member cam surface and operative in response to sliding movement of the cam member on the track to move the panel between opened and closed positions as the cam member cam surface moves slidably along the lever structure cam portion; characterized in that:
the lever structure has a U configuration and includes a transversely outwardly extending relatively long rear lever arm portion, an inboard central hinge portion extending parallel to the track and pivotally received in a hinged surfaced defined along the adjacent longitudinal edge of the panel, and a transversely outwardly extending relatively short front lever arm portion; the assembly includes means pivotally and slidably mounting an outboard end of the rear lever arm portion on the track and means pivotally and slidably mounting the outboard end of the front lever arm portion on the track; and the cam portion of the lever structure comprises a cam portion of the rear lever portion located inboard of the outboard end of the rear lever portion.

15. A sunroof assembly according to claim 14 wherein:
the track includes an inboard track surface and an outboard track surface, the cam member is mounted for sliding and angular movement on the inboard track surface, and the mounting means includes a front shoe slidably mounted on the inboard track surface forwardly of the cam member and receiving the outboard end of the front lever arm portion and a rear shoe slidably mounted on the outboard track surface and receiving the outboard end of the rear lever arm portion.

16. A sunroof assembly according to claim 15 wherein:

the cam surface of the cam member is defined by a longitudinally extending slot in the cam member and the cam portion of the rear lever arm portion passes through the slot to position its outboard end proximate the outboard track surface.

17. A sunroof assembly according to claim 15 wherein:

the front shoe is mounted for angular movement about the longitudinal axis of the inboard track surface and the rear shoe is mounted for angular movement about the longitudinal axis of the outboard track surface.

18. A lift-up sunroof assembly adapted to be fitted into an opening in the roof of a motor vehicle, comprising:

a frame sized to be fitted in the roof opening and defining an inboard longitudinally extending track surface adjacent the opening and an outboard longitudinally extending track surface;

a panel sized to fit within the frame and defining a hinge surface along a longitudinal side edge thereof proximate the inboard track surface;

a front shoe slidably mounted on the inboard track surface;

a rear shoe slidably mounted on the outboard track surface;

an elongated cam member slidably and rotationally mounted on the inboard track surface rearwardly of the front shoe and defining a longitudinally extending cam slot; and a lever structure having a U-shaped configuration and including a-central hinge portion pivotally mounted in the panel hinge surface, a front lever arm portion extending transversely outwardly from the front end of the hinge portion and received at its outboard end in the front shoe, and a rear lever arm portion extending transversely outwardly from the rear end of the hinge portion, passing through the slot in the cam member, and received at its outboard end in the rear shoe.

19. A lift-up sunroof assembly according to claim 18 wherein:

the front and rear shoes are mounted for angular movement about the longitudinal axes of the inboard and outboard track surfaces, respectively.

20. A lift-up sunroof assembly according to claim 19 wherein:

the inboard and outboard track surfaces are each defined by upper and lower arcuate surfaces and the cam member and the shoes have upper and lower arcuate surfaces for rotational coaction with the upper and lower track surfaces.

21. A lift-up sunroof assembly according to claim 20 wherein:

each of the shoes has a part cylindrical configuration and the cam member has flat inboard and outboard side faces.

* * * * *